(12) United States Patent
Guth et al.

(10) Patent No.: US 6,998,464 B2
(45) Date of Patent: Feb. 14, 2006

(54) METHOD FOR PRODUCING A SOLUTION CONSISTING OF A POLYMER CONTAINING RECURRENT AZOLE UNITS, SOLUTIONS PRODUCED ACCORDING TO SAID METHOD AND USE OF THE SAME

(75) Inventors: Thomas Guth, Schelklingen (DE); Jürgen Pawlik, Frankfurt (DE); Reiner Tiefenstädter, Rosbach (DE); Peter Brendel, Weilrod (DE); Frauke Jordt, Eppstein (DE)

(73) Assignee: PEMEAS GmbH, (DE)

( * ) Notice: Subject to any disclaimer, the term of this patent is extended or adjusted under 35 U.S.C. 154(b) by 0 days.

(21) Appl. No.: 10/399,600

(22) PCT Filed: Oct. 20, 2001

(86) PCT No.: PCT/EP01/12146

§ 371 (c)(1),
(2), (4) Date: Feb. 10, 2004

(87) PCT Pub. No.: WO02/36661

PCT Pub. Date: May 10, 2002

(65) Prior Publication Data

US 2004/0127633 A1    Jul. 1, 2004

(51) Int. Cl.
*C08G 69/00* (2006.01)

(52) U.S. Cl. ............... 528/327; 528/125; 528/128; 528/171; 528/183; 528/185; 528/186; 528/188; 528/219; 528/220; 528/331; 528/339.3; 528/492; 528/341

(58) Field of Classification Search ........... 528/492, 528/523, 327, 125, 183, 185, 128, 171, 186, 528/188, 219, 220, 339.9, 341
See application file for complete search history.

(56) References Cited

U.S. PATENT DOCUMENTS 4,260,652 A   4/1981   Taketani et al. ............ 427/245

5,525,436 A *   6/1996   Savinell et al. ............ 429/30
5,599,639 A   2/1997   Sansone et al. ............ 429/33
5,902,876 A *   5/1999   Murata et al. ............ 528/327

FOREIGN PATENT DOCUMENTS

DE   198 17 374   10/1999
EP   0 816 415   1/1998
WO   02/036249   5/2002

\* cited by examiner

Primary Examiner—James J. Seidleck
Assistant Examiner—Irina S. Zemel
(74) Attorney, Agent, or Firm—Connolly Bove Lodge & Hutz

(57) ABSTRACT

The present invention relates to a method of preparing a solution of a polymer comprising recurring azole units, which comprises dissolving a sufficiently dried polymer comprising recurring azole units of the formula

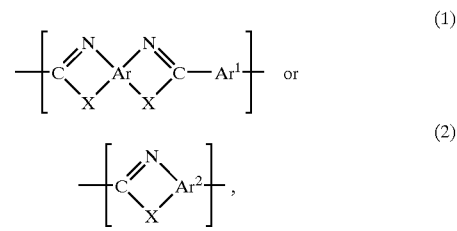

where the radicals Ar, $Ar^1$ and $Ar^2$ are tetravalent, divalent or trivalent aromatic or heteroaromatic groups and the radicals X, which are identical within a repeating unit, are each an oxygen atom, a sulfur atom or an amino group bearing a hydrogen atom, a group having 1–20 carbon atoms, preferably a branched or unbranched alkyl or alkoxy group, or an aryl group as further radical, in N,N-dimethylacetamide having a sufficiently low water content at a temperature above room temperature under an inert gas atmosphere, wherein a sufficiently dried polymer comprising recurring azole units of the formula (1) or (2) of which 90% by weight based on the total weight of the polymer comprising recurring azole units has a particle size of less than 1 mm is used.

15 Claims, No Drawings

METHOD FOR PRODUCING A SOLUTION CONSISTING OF A POLYMER CONTAINING RECURRENT AZOLE UNITS, SOLUTIONS PRODUCED ACCORDING TO SAID METHOD AND USE OF THE SAME

RELATED APPLICATION

This application claims benefit to and is a Rule 1.371 filing of PCT application No. PCT/EP01/12146 filed Oct. 20, 2001, now published WO 02/36661, which claims benefit to German application 100 52 237.8 filed Oct. 21, 2000.

The present invention concerns the field of polymer solutions. In particular, the invention relates to a method of preparing a polymer solution in which a sufficiently dried polymer comprising recurring azole units of the formula

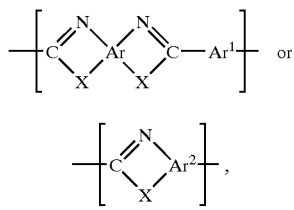

(1)

or (2)

where the radicals Ar, $Ar^1$ and $Ar^2$ are tetravalent, divalent or trivalent aromatic or heteroaromatic groups and the radicals X, which are identical within a repeating unit, are each an oxygen atom, a sulfur atom or an amino group which bears a hydrogen atom, a group having 1–20 carbon atoms, preferably a branched or unbranched alkyl or alkoxy group, or an aryl group as further radical, is dissolved in N,N-dimethylacetamide having a sufficiently low water content at a temperature above room temperature under an inert gas atmosphere. Furthermore, the invention relates to solutions of a polymer comprising recurring azole units which have been prepared by this method and to their use.

The solutions of a polymer comprising recurring azole units which have been prepared by this method can be used as film forming materials which are stable to heat and chemicals. Owing to their excellent adhesion to metal surfaces, they can also be used as heat-resistant metal adhesives. Owing to their resistance to all solvents, oils, acids and alkalis, they are in individual cases prized as paints, varnishes and coatings. Furthermore, they are also of importance for the preparation of polymer membranes which are used, in particular, in fuel cells.

It is already known that solutions of heat-resistant and chemically stable resins such as polymers comprising recurring azole units are difficult to obtain. Even when the resin is dissolved in specific organic solvents, its solubility decreases over time because of the formation of associates and because of other factors. Particularly when the concentration of polymers comprising recurring azole units in the solution is comparatively high, the formation of associates of azole units occurs very rapidly. The shelf life of such a solution is very short and extends from only a number of days to 1 or 2 weeks. In some cases, the shelf life of the solutions can be increased by addition of metal salts and other stabilizers. However, the introduction of metal salts is undesirable for most electronic components for whose production solutions of polymers comprising recurring azole units are required, because they impair the characteristic properties of the components. In particular, the properties of semiconductors and display devices are strongly influenced by such metallic impurities and the use of solutions of polymers comprising recurring azole units for these applications is very limited.

A first starting point for solving these problems is disclosed in the patent application EP-A-0816 415. This document provides a method of preparing solutions of a polymer comprising recurring benzimidazole units, which can be stored for a relatively long time without use of stabilizers and metal salts. In this method, a fully dried polymer comprising recurring benzimidazole units is dissolved in N,N-dimethylacetamide having a sufficiently low water content at an elevated temperature of 260° C. or higher under inert gas. A disadvantage of this method is that the solutions of a polymer comprising recurring benzimidazole units which are obtained in this way contain, even though some of them do not have a amine odor, impurities in the form of low molecular weight decomposition products such as dimethylamine and trimethylamine and material which can be separated off by filtration. The range of applications of such solutions of a polymer comprising recurring benzimidazole units is limited because the presence of impurities of this type does not allow it to be used in many fields. Thus, for example, the production of high-quality polyelectrolyte membranes which are used, inter alia, in fuel cells is virtually impossible when starting from the known solutions of a polymer comprising recurring benzimidazole units.

In view of the prior art, it is now an object of the present invention to provide methods of preparing a solution of a polymer comprising recurring azole units, which solution is essentially free of decomposition products and material which can be separated off by filtration. In particular, the use of complicated procedures such as chromatographic methods and extraction processes should be avoided in the removal of the decomposition products.

A further object is to provide a method which is both inexpensive to carry out and can be used on an industrial scale. Furthermore, the method should be able to be carried out easily and simply using commercially available components.

Another object of the invention is to provide improved solutions of a polymer comprising recurring azole units. In addition, their use should be indicated.

These objects and further objects which have not been explicitly mentioned but can readily be derived or concluded from the relationships summarized here are achieved by a method of preparing a solution of a polymer comprising recurring azole units having all the features of claim 1. Advantageous embodiments of the method of the invention are claimed in the subordinate claims referring back to claim 1. Novel solutions of a polymer comprising recurring azole units which have been prepared by this method are described in the product claims, while the claims in the use category claim preferred uses of a solution of a polymer comprising recurring azole units which has been prepared by the present method.

It could not readily have been foreseen that the use of a sufficiently dried polymer comprising recurring azole units of the formula (1) or (2) of which 90% by weight based on the total weight of the polymer comprising recurring azole units has a particle size of less than 1 mm in a method of the type described at the outset would make it possible to obtain polymer solutions comprising recurring azole units which are essentially free of impurities in the form of low molecular weight decomposition products such as dimethylamine and trimethylamine and material which can be separated off by filtration. The method of preparation mentioned can be carried out particularly inexpensively.

The fact that solutions of a polymer comprising recurring azole units which are essentially free of impurities in the form of low molecular weight decomposition products such as dimethylamine and trimethylamine and material which can be separated off by filtration can be obtained by using a sufficiently dried polymer comprising recurring azole units of the formula (1) or (2) of which 90% by weight based on the total weight of the polymer comprising recurring azole units has a particle size of less than 1 mm is particularly surprising because complete dissolution of polymers comprising recurring azole units of the formula (1) or (2) has hitherto not been possible without the formation of a significant amount of decomposition products. If attempts are made to suppress the formation of decomposition products by means of gentler dissolution conditions, it is found that the dissolution process occurs only incompletely if at all. It needs to be noted, in particular, that many applications require very pure solutions of a polymer comprising recurring azole units, so that both impurities and undissolved material have to be laboriously separated off before the applications.

At the same time, a series of further advantages can be achieved by means of the method of the invention. These include, inter alia:

The novel solutions of a polymer comprising recurring azole units have relatively long shelf lives of a number of weeks or months.

Even at temperatures below 260° C., complete dissolution of the polymers comprising recurring azole units of the formula (1) or (2) can be achieved.

The solutions of a polymer comprising recurring azole units contain no metallic impurities.

The method is simple and can be carried out reliably on an industrial scale.

The method of the present invention makes it possible to prepare solutions having a predefined content of a polymer comprising recurring azole units.

The present invention concerns polymers comprising recurring azole units of the formula

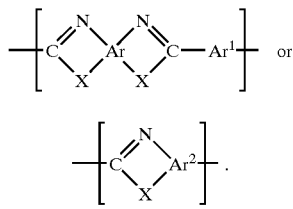

The radicals Ar, Ar$^1$ and Ar$^2$ are tetravalent, divalent or triavalent aromatic or heteroaromatic groups which may have one or more rings. Preferred groups are derived from benzene, naphthalene, biphenyl, diphenyl ether, diphenylmethane, diphenyldimethylmethane, bisphenone, diphenyl sulfone, quinoline, pyridine, anthracene and phenanthrene, each of which may also be substituted. Ar$^1$ can have any substitution pattern; in the case of phenylene, for example, Ar$^1$ can be ortho-, meta- or para-phenylene. Particularly preferred groups are derived from benzene and biphenyl, each of which may also be substituted.

The radicals X are each an oxygen atom (benzoxazole unit), a sulfur atom (benzothiazole unit) or an amino group (benzimidazole unit) which bears a hydrogen atom, a group having 1–20 carbon atoms, preferably a branched or unbranched alkyl or alkoxy group, or an aryl group as further radical. Preferred alkyl groups are short-chain alkyl groups having from 1 to 4 carbon atoms, e.g. methyl, ethyl, n- or i-propyl and t-butyl groups. Preferred aromatic groups are phenyl or naphthyl groups. The alkyl groups and the aromatic groups may be substituted. Preferred substituents are halogen atoms such as fluorine, amino groups or short-chain alkyl groups such as methyl or ethyl groups.

If polyazoles having recurring units of the formula (1) are used for the purposes of the present invention, the radicals X should be identical within a recurring unit.

A polyazole according to the invention can in principle also be made up of different recurring units which, for example, differ in their radical X. However, preference is given to only identical recurring units being present in the polyazole.

In a preferred embodiment of the present invention, the polymer comprising recurring azole units is a copolymer comprising at least two units of the formula (1) and/or (2) which are different from one another.

In a particularly preferred embodiment of the present invention, the polymer comprising recurring azole units is a polyazole containing only units of the formula (1) and/or (2).

The number of recurring azole units in the polymer is preferably greater than or equal to 10. Particularly preferred polymers comprise at least 100 recurring azole units.

For the purposes of the present invention, preference is given to using polymers comprising recurring benzimidazole units. An example of an extremely useful polymer comprising recurring benzimidazole units is represented by the formula (3):

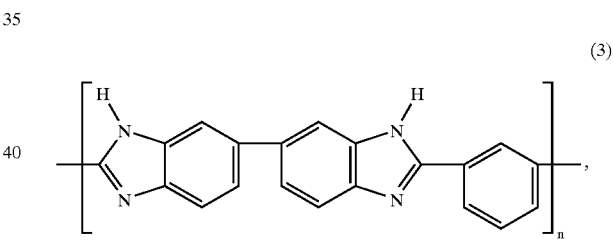

where n is an integer greater than or equal to 10, preferably greater than or equal to 100.

To enable the present method to be carried out, the polymer comprising recurring azole units has to have been sufficiently dried. The technique of drying a polymer, in particular a polymer comprising recurring azole units, is known to those skilled in the art. It refers to the removal of water which is not chemically bound from the polymer (moisture removal) by heating with or without vacuum. A characteristic parameter describing the dryness of a polymer is the residual water content of the polymer, which indicates the number of percent by weight of water based on the total weight of the polymer which is present in the polymer. Methods of determining the residual water content of a polymer, in particular a polymer comprising recurring azole units are known to those skilled in the art. It can be determined, for example, in a drying balance.

In the context of the method of the invention, the term "sufficiently dried" refers to a polymer comprising recurring azole units having a residual water content which makes it possible for the method of the invention to be carried out. The residual water content is preferably 5% by weight or less. In particularly preferred embodiments of the method, the residual water content is 3% by weight or less.

Since polymers comprising recurring azole units are known to have a pronounced tendency to absorb water, the dried polymers comprising recurring azole units have to be handled with great care until they are converted into solutions of a polymer comprising recurring azole units.

In the present method, polymers comprising recurring azole units of the formula (1)- or (2) are dissolved in N,N-dimethylacetamide having a sufficiently low water content. It is known that water in the N,N-dimethylacetamide reduces the solubility of polymers comprising recurring azole units and can lead to formation of alkylamines by hydrolysis of N,N-dimethylacetamide during the dissolution process. The presence of such impurities in the solution of a polymer comprising recurring azole units is disadvantageous for the abovementioned reasons. They can cause an unpleasant odor of the solution of a polymer comprising recurring azole units and limit its applications.

For the purposes of the present invention, the term "sufficiently low water content" used in connection with N,N-dimethylacetamide means a water content which makes it possible for the method of the invention to be carried out. Preference is given to using N,N-dimethylacetamide having a water content of less than 0.4% by weight based on the total weight of the N,N-dimethylacetamide in the method of the invention. Particular preference is given to using N,N-dimethylacetamide having a water content of less than 0.3% by weight based on the total weight of the N,N-dimethylacetamide. Very particular preference is given to using N,N-dimethylacetamide having a water content of less than 0.2% by weight based on the total weight of the N,N-dimethylacetamide. In a very particularly preferred embodiment of the present invention, N,N-dimethylacetamide having a water content of less than 0.15% by weight, in particular less than 0.1% by weight, based on the total weight of the N,N-dimethylacetamide, is used.

The temperature is a further parameter in the present method. It does not have to be carried out completely at a uniform temperature. A preferred embodiment comprises the steps:
 (1) filling the reaction vessel with polymer comprising recurring azole units and N,N-dimethylacetamide at room temperature;
 (2) heating the reaction vessel to a, particular maximum temperature;
 (3) stirring at a constant temperature, particularly preferably at the maximum temperature;
 (4) cooling the reaction vessel.

When the term temperature is used below, it refers to the maximum temperature. The method of the invention is preferably carried out at a temperature above room temperature. Particular preference is given to temperatures in the range from 25° C. to 259° C. Very particularly preferred temperatures are in the range from 160° C. to 250° C. Even more preferred temperatures are in the range from 170° C. to 240° C. Temperatures in the range from 180° C. to 220° C. are very particularly favorable. In a very particularly preferred embodiment, the temperature is in the range from 180° C. to 210° C.

In a preferred embodiment of the present invention, the use of inert gas in the dissolution of the polymer comprising recurring azole units is preferred. Inert gases which can be used include, inter alia, nitrogen, argon, etc., and also mixtures of such gases. In a particularly preferred embodiment, the polymer comprising recurring azole units is dispersed in the solvent in a reactor and the oxygen is removed from the reactor, e.g. by passing high-purity nitrogen having a low water content through the solution for 30 minutes.

The particle size of the polymer comprising recurring azole units is of importance in carrying out the method of the invention. The precise definition of the particle size depends on the particle shape of the polymer. There are no restrictions in respect of the particle shape for carrying out the method; rather, all conceivable particle shapes are suitable for preparing the solutions of a polymer comprising recurring azole units.

There are a number of measurement methods for determining the particle size and the particle size distribution. For the purposes of the present invention, it is sufficient to determine the particle size by sieve analysis. A set of sieves having various mesh openings is arranged one above the other in a sieving machine. In sieve analysis, the particle size is determined by the mesh opening of that sieve which just allows the particles (particles passing the sieve, undersize particles) to pass through it. The sieves are characterized by their mesh opening in millimeters.

To carry out the present method, polymers comprising recurring azole units of which 90% by weight have a particle size of less than. 1 mm are preferred. Particular preference is given to polymers comprising recurring azole units of which 90% by weight have a particle size of less than 700 $\mu$m. In a very particularly preferred embodiment, use is made of polymers comprising recurring azole units of which 90% by weight have a particle size of less than 400 $\mu$m.

For the purposes of the present method, the particle size of the polymer comprising recurring azole units is preferably reduced by milling. Other methods are also conceivable. For the purposes of the present invention, milling is a commutation process in which the particle size of the material is reduced in crushers and especially in mills of various designs. Milling can be carried out as a dry or wet process or as cold milling (cryogenic milling). In a particularly preferred embodiment of the present method, the polymer comprising recurring azole units is firstly milled and then dried.

A further feature of the present method is the time over which the polymer comprising recurring azole units is dissolved. This encompasses the residence time of the polymer comprising recurring azole units in the reactor. Short residence times are particularly desirable for economic reasons. The polymer comprising recurring azole units is preferably dissolved in less than 10 hours. The dissolution is particularly preferably carried out in less than 6 hours. In a very particularly preferred embodiment, the polymer comprising recurring azole units is dissolved in less than 4 hours.

Solutions according to the invention of a polymer comprising recurring azole units contain at most small amounts of by-products. Methods of determining the proportions of low molecular weight compounds such as dimethylamine and trimethylamine in solutions are known to those skilled in the art. The concentrations can be determined, for example, by gas chromatography. Other methods are also conceivable. Preference is given to determining the proportions of low molecular weight compounds such as dimethylamine and trimethylamine by means of head-space analysis at 50° C., and the type of impurities can be determined by coupling with MS. The height of the DMAc peak is preferably assigned a value of one unit. The height of the peaks of the impurities is then less than 0.1 unit in the method of the invention.

The novel solutions of a polymer comprising recurring azole units can be essentially free of material which can be separated off by filtration. Filtration is known per se and is described, for example, in Ullmann's Encyclopedia of Industrial Chemistry, Fifth Edition, keyword "Filtration". For the purposes of the present invention, filtration is the separation of solid particles from a liquid with the aid of a porous layer (filter medium) which allows the liquid to pass through it while holding back the solids. It is assumed that separation occurs on the basis of the size differences.

The filtration preferably takes place at 100° C. However, it can be carried out at another temperature if the viscosity of the solution requires it.

The polymer solution comprising recurring benzazole units is preferably filtered through a candle filter or a deep bed filter having a pore size in the range from 0.01 $\mu$m to 1 mm. Particular preference is given to pore sizes in the range from 0.1 $\mu$m to 100 $\mu$m and very particular preference is given to those in the range from 0.3 $\mu$m to 10 $\mu$m. These figures are intended to serve as a guide, since the purification is also dependent on the viscosity of the solvent and the particle size of the precipitate.

Preferred solutions of a polymer comprising recurring azole units contain less than 3% by weight of material which can be separated off by filtration through a filter having a pore opening of 4 $\mu$m at 100° C.

The solutions of a polymer comprising recurring azole units obtained by the method of the invention are preferably essentially free of impurities in the form of low molecular weight decomposition products such as dimethylamine and trimethylamine and also material which can be separated off by filtration.

The concentration of the polymer comprising recurring azole units in the solutions of the invention is preferably 25% by weight or less, based on the total weight of the solution. Particular preference is given to solutions having a concentration of the polymer comprising recurring azole units in the range from 1% by weight to 40% by weight based on the total weight of the solution. Very particular preference is given to solutions having a concentration of the polymer comprising recurring azole units in the range from 10% by weight to 30% by weight based on the total weight of the solution. The greatest preference is given to solutions having a concentration of the polymer comprising recurring azole units in the range from 15% by weight to 25% by weight based on the total weight of the solution.

Processes for producing membranes are known per se. The resulting membranes have a wide range of uses. Owing to their particular properties, polymer electrolyte membranes are preferably used in fuel cells.

The invention is illustrated below by means of examples and a comparative example, which are obtainable using solutions according to the invention, without implying a, restriction of the invention to these examples.

1$^{st}$ EXAMPLE (MILLING 260° C.)

Polybenzimidazole is comminuted by means of a mill so that 90% by weight of the particles have a particle size of less than 300 $\mu$m. The powder obtained is dried to constant weight at 95–110° C. in a high vacuum.

3644 g of N,N-dimethylacetamide (residual water content: 0.27% by weight) and 800 g of dried polybenzimidazole powder are placed under inert gas in a reactor and heated to 260° C. over a period of 3.5 hours. The polymer is stirred at this temperature for 2 hours, then cooled over a period of 2 hours to 100° C. and filtered via a heated pressure filter unit provided with a PP deep bed filter (5 $\mu$m). The solids content of the polybenzimidazole solution obtained in this way is determined by precipitating part of the solution, filtering off the precipitated polymer and drying the residue to constant weight under reduced pressure. A solids content of 14.5% by weight (±0.4% by weight; intended value: 17.5% by weight) is determined gravimetrically.

The decomposition products in the solution prepared in this way are determined by GC analysis. For this purpose, a small amount of the solution is introduced into the GC instrument and heated to 50° C. there. Constituents which are given off are collected and separated via a GC column. The analysis indicates a plurality of decomposition products in relatively high concentrations. The assignment of the decomposition products is achieved by mass spectrometry. Thus, water (1, M=18 g/mol) and also dimethylamine (2, M=45 g/mol), trimethylamine (3, M=59 g/mol) and N,N,N', N'-tetramethyldiaminomethane (4, M=102 g/mol) are detected. The peak No. 5 is finally to be assigned to dimethylacetamide (M=87 g/mol) (cf. Table 1).

TABLE 1

| | GC analysis of Example 1 | | | |
|---|---|---|---|---|
| Peak | Peak height [cm] | Ratio to peak 5 [%] | Weight by area [mg] | % by weight |
| 1 | 0.17 | 0.71 | 0.35 | 0.48 |
| 2 | 9.00 | 37.74 | 11.87 | 16.44 |
| 3 | 0.58 | 2.43 | 0.56 | 0.78 |
| 4 | 1.52 | 6.37 | 2.52 | 3.49 |
| 5 | 23.85 | 100.00 | 56.91 | 78.81 |
| Total | | | 72.21 | 100.00 |

Owing to the low-boiling components such as dimethylamine and trimethylamine, casting of a membrane from such solutions and subsequent drying results in bubble formation within the polymer layer and the quality of the membrane is correspondingly reduced.

2$^{nd}$ EXAMPLE (MILLED, 200° C.)

Polybenzimidazole is comminuted by means of a mill so that 90% by weight of the particles have a particle size of less than 300 $\mu$m. The powder obtained is dried to constant weight at 95–110° C. in a high vacuum.

3644 g of N,N-dimethylacetamide (residual water content: 0.27% by weight) and 800 g of dried polybenzimidazole powder are placed under inert gas in a reactor and heated to 200° C. over a period of 2 hours. The vessel was vented at 120° C. and at 150° C. during the heating phase. The polymer is stirred at this temperature for 4 hours, then cooled over a period of 1.5 hours to 100° C. and filtered via a heated pressure filter unit provided with a PP deep bed filter (5 $\mu$m). The solids content of the polybenzimidazole solution obtained in this way is determined by precipitating part of the solution, filtering off the precipitated polymer and drying the residue to constant weight under reduced pressure. A solids content of 14.95% by weight (±0.4% by weight; intended value: 15.0% by weight) is determined gravimetrically.

TABLE 2

GC analysis of Example 2

| Peak | Peak height [cm] | Ratio to peak 5 [%] | Weight by area [mg] | % by weight |
|---|---|---|---|---|
| 1 | 0.18 | 0.75 | 0.45 | 1.24 |
| 2 | 0.00 | 0.00 | 0.00 | 0.00 |
| 3 | 0.00 | 0.00 | 0.00 | 0.00 |
| 4 | 0.00 | 0.00 | 0.00 | 0.00 |
| 5 | 23.85 | 100.00 | 35.70 | 98.76 |
| Total | | | 72.21 | 100.00 |

GC analysis is not able to detect any decomposition products in this solution of a polymer comprising recurring azole units (cf. Table 2). Owing to the absence of decomposition products in the solution, this can readily be processed to give high-quality membranes having thicknesses in the range from 5 to 100 μm.

COMPARATIVE EXAMPLE (UNMILLED, 200° C.)

A polybenzimidazole in which 10.86% by weight of the particles have a particle size of greater than 1000 μm is used. The polybenzimidazole is dried to constant weight at 95–110° C. in a high vacuum.

3250 g of N,N-dimethylacetamide (residual water content: 0.27% by weight) and 600.7 g of dried polybenzimidazole are placed under inert gas in a reactor and heated to 200° C. over a period of 2 hours. The polymer is stirred at this temperature for 3 hours, then cooled over a period of 1.5 hours to 100° C. and filtered via a heated pressure filter unit provided with a PP deep bed filter (5 μm). The solids content of the polybenzimidazole solution obtained in this way is determined by precipitating part of the solution, filtering off the precipitated polymer and drying the residue to constant weight under reduced pressure. A solids content of 14.04% by weight (±0.4% by weight; intended value: 16.0% by weight) is determined gravimetrically.

SHELF LIFE OF POLYMER SOLUTIONS ACCORDING TO THE INVENTION

To determine the shelf life, polybenzimidazole solutions were prepared by a method analogous to that of Example 2 and filtered at a temperature of 100° C. through a candle filter (120 μm) or a deep bed filter. The shelf life is defined as the time period from when the solution is prepared until it gels. The results are summarized in Table 3.

TABLE 3

Shelf life of polybenzimidazole solutions according to the invention

| w(Polybenzimidazole) [% by weight] | Shelf life [days] |
|---|---|
| 20 | <7 |
| 17.5 | ca. 14 |
| 15 | ca. 21 |
| 12 | >21 | w(polybenzimidazole): proportion by weight of polybenzimidazole based on the total weight of the solution

What is claimed is:

1. A method of preparing a solution of a polymer comprising recurring azole units, which comprises dissolving a sufficiently dried polymer comprising recurring azole units of the formula

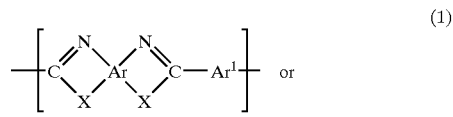

(1)

or

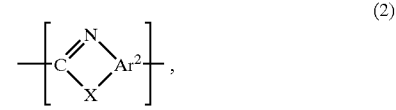

(2)

wherein the radicals Ar, Ar$^1$ and Ar$^2$ are tetravalent, divalent or trivalent aromatic or heteroaromatic groups and the radicals X, which are identical within a repeating unit, are each an oxygen atom, a sulfur atom or an amino group bearing a hydrogen atom, a group having 1–20 carbon atoms, in N,N-dimethylacetamide having a sufficiently low water content at a temperature of 250° C. or less under an inert gas atmosphere, wherein a sufficiently dried polymer comprising recurring awls units of the formula (1) or (2) of which 90% by weight based on the total weight of the polymer comprising recurring azole units has a particle size of less than 1 mm is used.

2. The method as claimed in claim 1, wherein X, which are identical within a repeating unit, are each an oxygen atom, a sulfur atom or an amino group bearing a hydrogen atom, a branched or unbranched alkyl, alkoxy group or an aryl group.

3. The method as claimed in claim 1, wherein the polymer comprising recurring azole units is firstly milled and then dried before dissolution in N,N-dimethylacetamide.

4. The method as claimed in claim 1, wherein the polymer comprising recurring azole units is dissolved at a temperature in the range from 160° C. to 250° C.

5. The method as claimed in claim 3, wherein the polymer comprising recurring azole units is dissolved at a temperature in the range from 180° C. to 220° C.

6. The method as claimed in claim 4, wherein a dried polymer comprising recurring azole units of the formula (1) or (2) which has a water content of less than 3% by weight based on the total weight of the polymer comprising recurring azole units is used.

7. The method as claimed in claim 5, wherein a dried polymer comprising recurring azole units of the formula (1) or (2) which has a water content of less than 3% by weight based on the total weight of the polymer comprising recurring azole units is used.

8. The method as claimed in claim 1, wherein said N,N-dimethylacetamide has a water content of less than 0.4% by weight based on the total weight of the N,N-dimethylacetamide.

9. The method as claimed in claim 7, wherein said N,N-dimethylacetamide has a water content of less than 0.4% by weight based on the total weight of the N,N-dimethylacetamide.

10. The method as claimed in claim 1, wherein the polymer comprising recurring azole units is dissolved over a period of less than 10 hours.

11. The method as claimed in claim 1, wherein a polymer comprising recurring benzimidazole units of the formula (3):

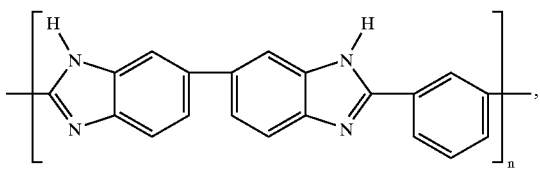

wherein n is an integer greater than or equal to 10, is used.

12. A solution of a polymer comprising recurring azole units obtained by the method as claimed in claim 1, wherein, in head-space analysis of the solution of a polymer comprising recurring azole units at 50° C., the height of the peaks of dimethylamine and/or trimethylamine is less than 10% of the height of the DMAc peak.

13. A solution of a polymer comprising recurring azole units obtained by the method as claimed in claim 1, wherein the solution of a polymer comprising recurring azole units contains less than 3% by weight, based on the total weight of the polymer comprising recurring azole units, of material which can be separated off by filtration through a filter having a pore opening of 4 pm at 100° C.

14. The solution as claimed in claim 13, wherein, in head-space analysis of the solution of a polymer comprising recurring azole units at 50° C., the height of the peaks of dimethylamine and/or trimethylamine is less than 10% of the height of the DMAc peak.

15. The solution as claimed in claim 14 which contains 25% by weight or less) based on its total weight, of polymer comprising recurring azole units.

* * * * *

UNITED STATES PATENT AND TRADEMARK OFFICE
CERTIFICATE OF CORRECTION

PATENT NO.         : 6,998,464 B2
APPLICATION NO. : 10/399600
DATED              : February 14, 2006
INVENTOR(S)        : Thomas Guth et al.

It is certified that error appears in the above-identified patent and that said Letters Patent is hereby corrected as shown below:

In Claim 1, at column 10, line 27, "comprising recurring awls units of the formula (1)" should read -- comprising recurring azole units of the formula (1) --

In Claim 15, at column 12, line 15, "25% by weight or less) based on its total weight, of polymer" should read -- 25% by weight or less, based on its total weight, of polymer --

Signed and Sealed this

Eleventh Day of July, 2006

JON W. DUDAS
*Director of the United States Patent and Trademark Office*